(12) United States Patent
Zhu et al.

(10) Patent No.: US 7,623,494 B2
(45) Date of Patent: Nov. 24, 2009

(54) ADJUSTMENT OF A CLEAR CHANNEL ASSESSMENT (CCA) THRESHOLD

(75) Inventors: Jing Zhu, Hillsboro, OR (US); Boris Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 637 days.

(21) Appl. No.: 11/436,257

(22) Filed: May 18, 2006

(65) Prior Publication Data

US 2008/0008133 A1    Jan. 10, 2008

(51) Int. Cl.
*H04W 4/00*    (2009.01)
*H04L 12/413*    (2006.01)

(52) U.S. Cl. .......... 370/333; 370/445; 455/511
(58) Field of Classification Search ........... 370/333, 370/445; 455/511
See application file for complete search history.

(56) References Cited

U.S. PATENT DOCUMENTS

| | | | |
|---|---|---|---|
| 6,965,942 B1 * | 11/2005 | Young et al. ............. | 709/232 |
| 7,443,821 B2 * | 10/2008 | Cave et al. .............. | 370/333 |
| 7,477,627 B2 * | 1/2009 | Ginzburg et al. ........ | 370/333 |
| 2007/0060155 A1 * | 3/2007 | Kahana et al. .......... | 455/450 |
| 2008/0125160 A1 * | 5/2008 | Zhu ....................... | 455/522 |

* cited by examiner

*Primary Examiner*—Barry W Taylor
(74) *Attorney, Agent, or Firm*—Lee & Hayes, PLLC

(57) ABSTRACT

Embodiments of adjustment of a clear channel assessment threshold are presented herein.

16 Claims, 6 Drawing Sheets

ADJUSTMENT OF A CLEAR CHANNEL ASSESSMENT (CCA) THRESHOLD

BACKGROUND

The prevalence of wireless communication is ever increasing. For example, users may use a wireless local area network (WLAN) to communicate using a wide range of devices, such as desktop personal computers, laptop computers, personal digital assistants (PDAs), wireless phones, wireless routers, wireless access points (WAPs), and so on.

Additionally, the range of locations, in which, users may employ these devices is also ever increasing. For example, a user may set-up a wireless access point in his apartment to obtain wireless access to the Internet. In another example, a corporation may provide devices (e.g., wireless routers and computers) that incorporate wireless techniques such that employees of the corporation may communicate, one with another, using the devices. In further examples, hotels, airports, coffee shops, and so on may also provide wireless access to the Internet to users for a fee.

However, because such a large and diverse range of wireless devices may be used in a wide range of locations, interference may be encountered which adversely affects the ability to communicate using wireless techniques at the locations. For example, a collection of closely-grouped wireless devices may "crowd" wireless networks which are used by the devices, which may thereby limit each device's ability to communicate as desired.

BRIEF DESCRIPTION OF THE DRAWINGS

The same reference numbers are utilized in instances in the discussion to reference like structures and components.

DETAILED DESCRIPTION

In the following discussion, an exemplary environment and devices are described which may provide and/or utilize clear channel assessment (CCA) threshold adjustment techniques. Exemplary procedures are then described which may be employed by the exemplary environment and/or devices, as well as by other environments and/or devices without departing from the spirit and scope thereof.

Exemplary Devices

Figure 1:
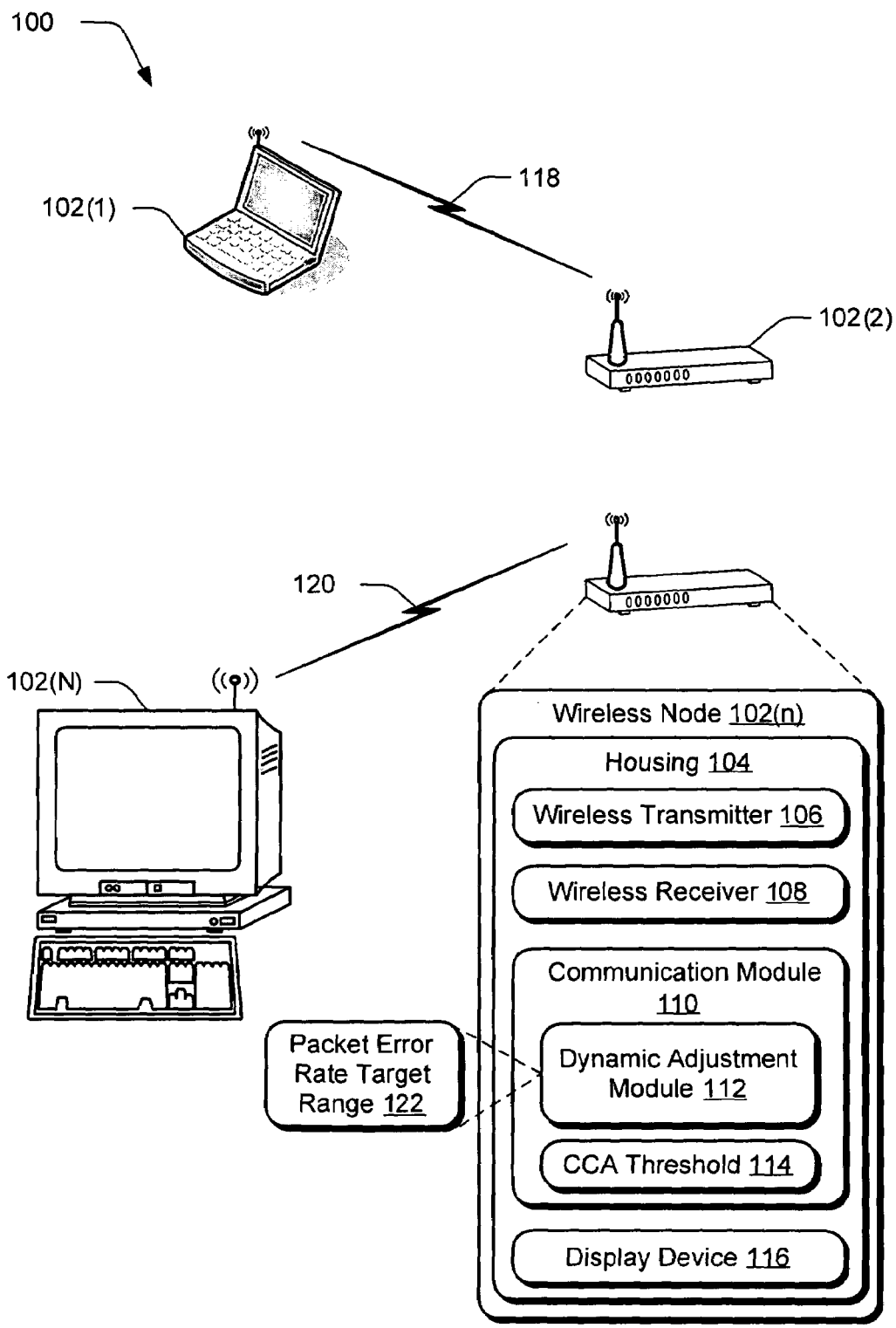
FIG. 1 is an illustration of an exemplary implementation of an environment that is operable to adjust a clear channel assessment threshold.

FIG. 1 illustrates an exemplary implementation of an environment 100 that is operable to employ techniques for distributed coordination of a clear channel assessment (CCA) threshold. The environment 100, as illustrated, includes a plurality of wireless nodes 102(1), 102(2), 102(n), . . . , 102(N). The wireless nodes 102(1)-102(N) may be configured in a variety of ways to employ wireless communication techniques. For example, one or more of the wireless nodes may be configured as a computing device, such as a traditional desktop computer (e.g., wireless node 102(N) illustrated as a desktop PC), a server, a notebook computer (e.g., wireless node 102(1) illustrated as a laptop computer), a personal information appliance, and so on.

Wireless nodes 102(1)-102(N) may also be configured to form an "infrastructure" of a wireless network, such as a wireless router, wireless access point (WAP), base station, and so on. Thus, the wireless nodes 102(1)-102(N) may be configured as a "thick" device having significant processing and memory resources (e.g., the illustrated laptop and desktop PC) to a "thin" device having relatively limited processing and/or memory resources that are dedicated to a particular function, such as a wireless router. A wide variety of other configurations are also contemplated.

Wireless node 102(n), for instance, as illustrated includes a housing 104 that contains a wireless transmitter 106, a wireless receiver 108, a communication module 110 having a dynamic adjustment module 112 with a clear channel assessment (CCA) threshold 114, and a display device 116. The wireless transmitter and receiver 106, 108 are configured to send and receive data through wireless communication using a variety of wireless communication standards. The display device 116 is configured to display data relating to wireless communication, such as status lights of the illustrated wireless station, the illustrated monitors of the desktop PC and the laptop, and so on.

The dynamic adjustment module 110 is representative of functionality that may be employed by the wireless nodes (e.g., wireless node 102(n)) to adjust their respective CCA thresholds, e.g., CCA threshold 112 of wireless node 102(n), further discussion of which may be found below. Generally, any of the functions described herein can be implemented using firmware, hardware (e.g., fixed logic circuitry), software, manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices, such as through random access memory and/or a hard drive of the illustrated laptop and desktop PC. The features of the techniques to provide adjustment of a CCA threshold described below are platform-independent, meaning that the techniques may be implemented on a variety of commercial computing platforms having a variety of processors.

The environment 100 is representative of a variety of different wireless environments. For example, the environment 100 may represent a high density (HD) network having overlapping wireless nodes (e.g., wireless stations, base station systems, and so on), in which, combined network capacity is limited due to co-channel interference and adjacent channel saturation. For instance, transmissions performed by the wireless nodes 102(1)-102(N) may interfere with each other such that wireless communication performed by one of the wireless nodes has an adverse effect on wireless communication performed by other wireless nodes.

One technique that may be used to avoid interference is referred to as "Clear Channel Assessment". Clear channel assessment may be used by the respective wireless node to determine whether a wireless communication channel is "occupied", e.g., "busy" with another wireless communication and/or has an amount of interference that makes the wireless communication channel unsuitable for communication. For example, the wireless communication channel may be occupied through use by another wireless node. The wireless communication channel may also be "occupied" by co-channel interference, adjacent channel saturation, and so forth. In this way, the amount of incoming energy detected may be used to determine whether the wireless communication channel is "available" or "not available" for communication, e.g., "occupied" or "not occupied".

A variety of techniques may be utilized to determine availability using the CCA threshold. For example, a first mode may be utilized such that when energy is above a threshold, the CCA reports a busy medium. In another mode, a "carrier sense with timer" is used, such that, detection of energy during a period of time specified by the timer is used. In a further mode, a combination of carrier sense with the threshold is utilized. In this mode, a CCA may indicate "TRUE" when energy is not detected above the threshold or carrier sensed during the period of time, further discussion of which may be found in Section 18.4.8.4. of the IEEE Standard 802.11b, 1999 and Section 17.3.11 of the IEEE Standard 802.11a, 1999.

The communication module 110 may use the CCA threshold 114 to specify the minimum amount of incoming energy for the wireless communication channel to be considered as not available for communication. By comparing an amount of detected incoming energy with the CCA threshold 114, for instance, the communication module 110 may determine availability of the wireless communication channel for communications to be transmitted by the wireless node 102(n) using the wireless transmitter 106. Thus, setting of the CCA thresholds by each of the wireless nodes 102(1)-102(N) may determine how communication is performed in the environment 100 by how "aggressive" or "passive" the CCA thresholds of the wireless nodes are set.

For example, the environment of FIG. 1 is illustrated as having two active transmissions. A first transmission 118 is transmitted from wireless node 102(1) to wireless node 102 (2) and a second transmission 120 is transmitted from wireless node 102(N) to 102(n). One technique that may be utilized to improve likelihood of successful communication is to employ "stand-alone tuning", such that each wireless node 102(1)-102(N) adjusts its own CCA threshold without coordination such that interference between the first and second transmissions 118, 120 is minimized.

The communication module 110, for instance, may employ a dynamic adjustment module 112. The dynamic adjustment module 112 is representative of functionality to adjust the CCA threshold 114 to maintain a packet error rate (PER) within a PER target range 122. The PER target range 122 may be set to approximate optimal spatial reuse in the environment 100. Therefore, maintenance of the CCA threshold 114 within the PER target range 122 by one or more of the wireless nodes 102(1)-102(N) in the environment 100 may function to optimize use of wireless resources in the environment 100. It should be noted that in an implementation the dynamic adjustment module 112 is not limited to use by an access point, but may also be used by wireless stations as well such that any wireless node 102(1)-102(N), when employing the dynamic adjustment module 112, may adjust its respective CCA threshold 114. Further discussion of the packet error rate target range 122 may be found in relation to FIG. 2, while further discussion of adjustment of CCA thresholds may be found in relation to FIGS. 3-6.

Figure 2:
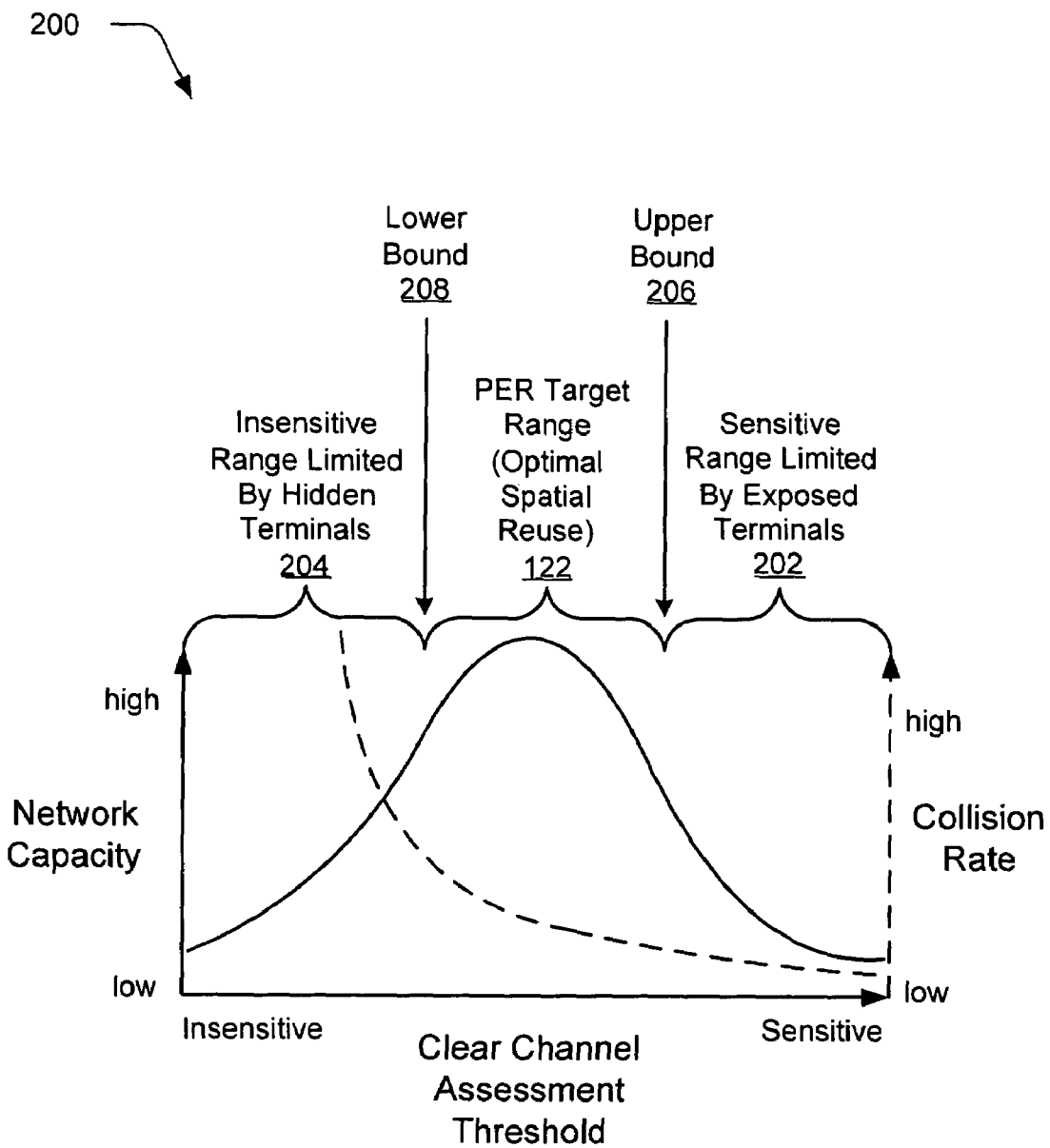
FIG. 2 is an illustration of an exemplary implementation of a packet error rate target range.

FIG. 2 illustrates an exemplary implementation of a target range of a packet error rate that results in optimal spatial reuse in the environment of FIG. 1. The exemplary illustration of FIG. 2 includes a graph 200 that plots the effects of a clear channel assessment (CCA) threshold on the X-axis against a network capacity and a collision rate on the Y-axis. Thus, the graph 200 may be representative of a relation of the CCA threshold, collision rate and network capacity in an interference-limited high density environment, e.g., the environment 100 of FIG. 1.

When the CCA threshold is considered "sensitive" and therefore in a range limited by exposed terminals 202, the collision rate is relatively low. However, the network capacity is also low because of too many deferrals, such as due to far-away wireless transmissions encountered due to exposed terminals. When the CCA threshold is considered "insensitive" and therefore in a range limited by hidden terminals 204, network capacity is also low. For example, the collision rate may increase (shown as a dashed line in FIG. 2) thereby decreasing network capacity indicated by the solid line in FIG. 2.

Therefore, a PER target range 122 may be defined between the sensitive and insensitive ranges (e.g., by the upper and lower bounds 206, 208) that results in optimal spatial reuse. For example, the PER target range 122 may optimize spatial reuse by balancing collision rate and deferrals thereby increasing network capacity. Therefore, tuning of the CCA threshold according to the packet error rate (e.g., measured collision rate, unsuccessful transmission, number of retransmissions, and so on) may be used to optimize the network capacity, further discussion of which may be found in relation to the following procedures.

Exemplary Procedures

The following discussion describes clear channel assessment threshold adjustment techniques that may be implemented utilizing the previously described systems and devices. The procedures are shown as a set of blocks that specify operations performed by one or more devices (e.g., circuits) and are not necessarily limited to the orders shown for performing the operations by the respective blocks.

Figure 3:
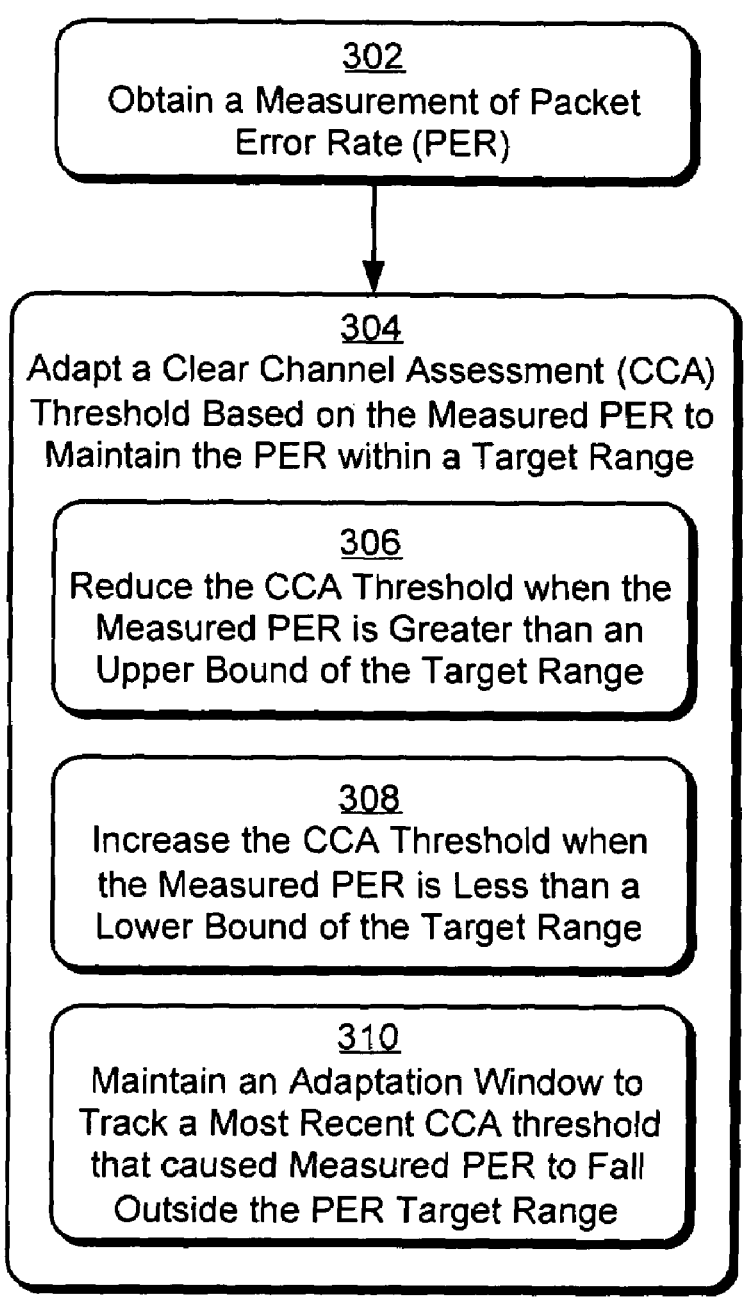
FIG. 3 is a flow diagram depicting a procedure in an exemplary implementation in which a clear channel assessment (CCA) threshold is adapted based on measured packet error rate (PER).

FIG. 3 depicts a procedure 300 in an exemplary implementation in which a clear channel assessment (CCA) threshold is adapted based on measured packet error rate (PER). During discussion of this exemplary procedure, reference will also be made to the exemplary environment 100 of FIG. 1, however, it should be apparent that implementation of the procedure 300 is not limited to that environment 100.

A measurement of packet error rate (PER) is obtained (block 302). For example, the measurement may be obtained by measuring collision rate, unsuccessful transmissions of data packets, number of retransmissions of data packets, and so on encountered by the wireless node 102(n).

A clear channel assessment (CCA) threshold is adapted based on the measured PER to maintain the PER within a target range (block 304). For example, the CCA threshold (e.g., CCA threshold 114) may be reduced when the measured PER is greater than an upper bound (e.g., upper bound 206) of the target range (e.g., the PER target range 122) (block 306). Likewise, the CCA threshold (e.g., CCA threshold 114) may be increased when the measured PER is less than a lower bound (e.g., lower bound 208) of the target range (block 308).

Therefore, when the measured PER falls outside the target range, the CCA threshold may be adjusted to maintain the PER within the target range.

In another example, an adaptation window is maintained to track a most recent CCA threshold that caused measured PER to fall outside the PER target range (block 310). For instance, the adaptation window may be used to adjust the CCA threshold to speed convergence of CCA adaptation based on the packet error rate, further discussion of which may be found in relation to FIGS. 5 and 6. A variety of other examples are also contemplated.

Figure 4:
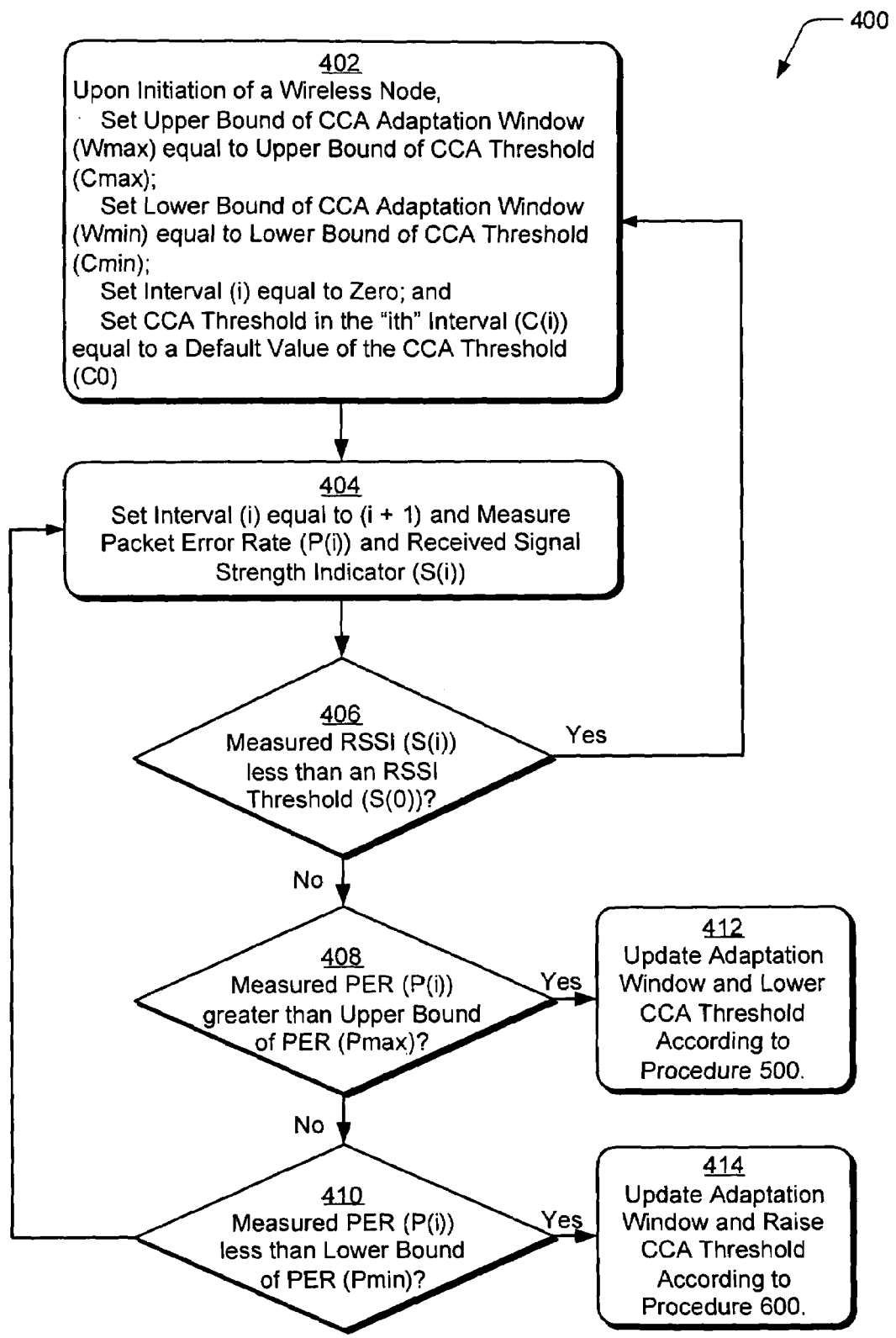
FIG. 4 is a flow diagram depicting a procedure in an exemplary implementation in which packet error rate is measured when a measured received signal strength is above a predefined threshold.
Figure 5:
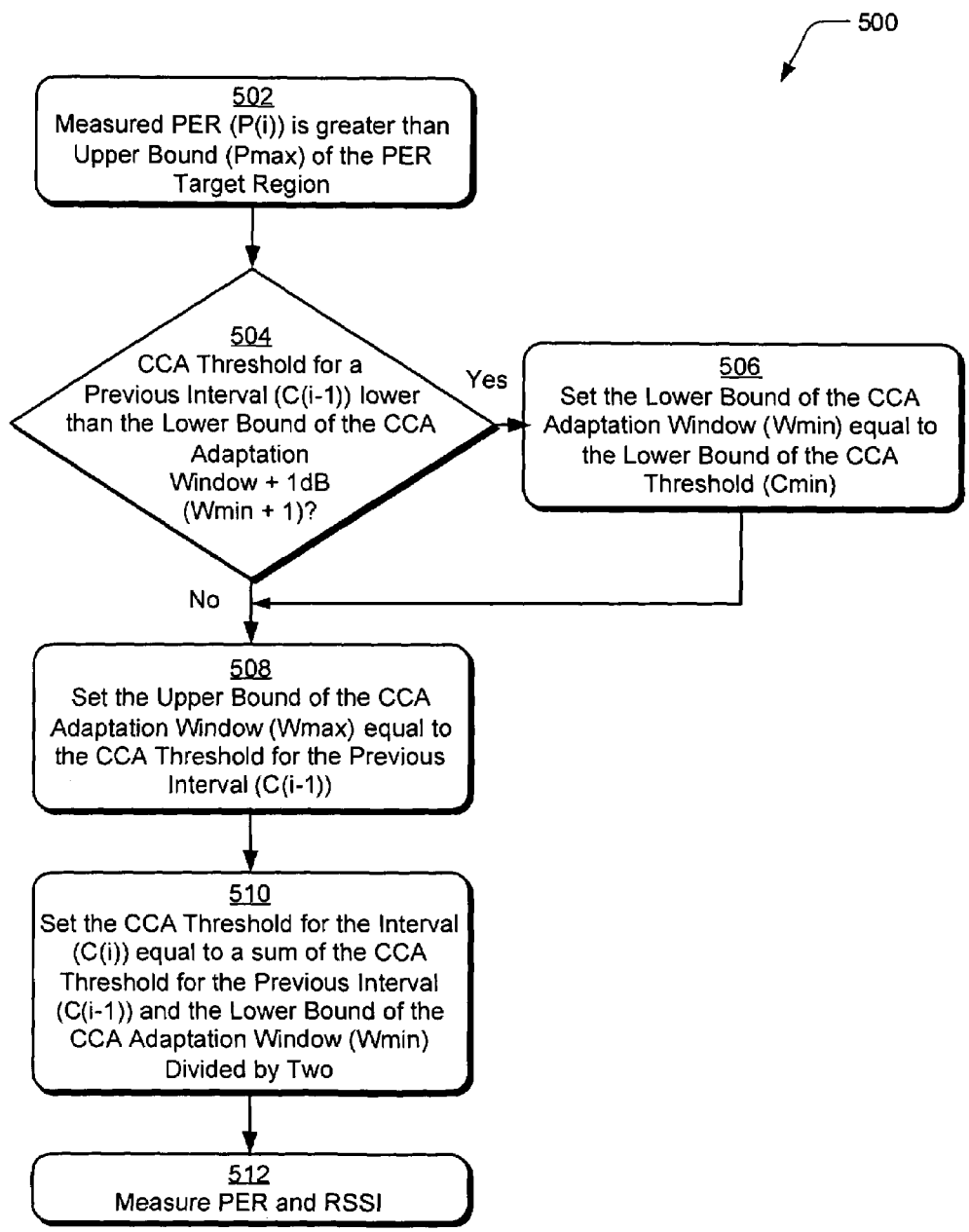
FIG. 5 is a flow diagram depicting a procedure in an exemplary implementation in which an adaptation window is updated and a clear channel assessment threshold is reduced when a measured packet error rate of FIG. 4 is greater than an upper bound of a packet error rate target range.
Figure 6:
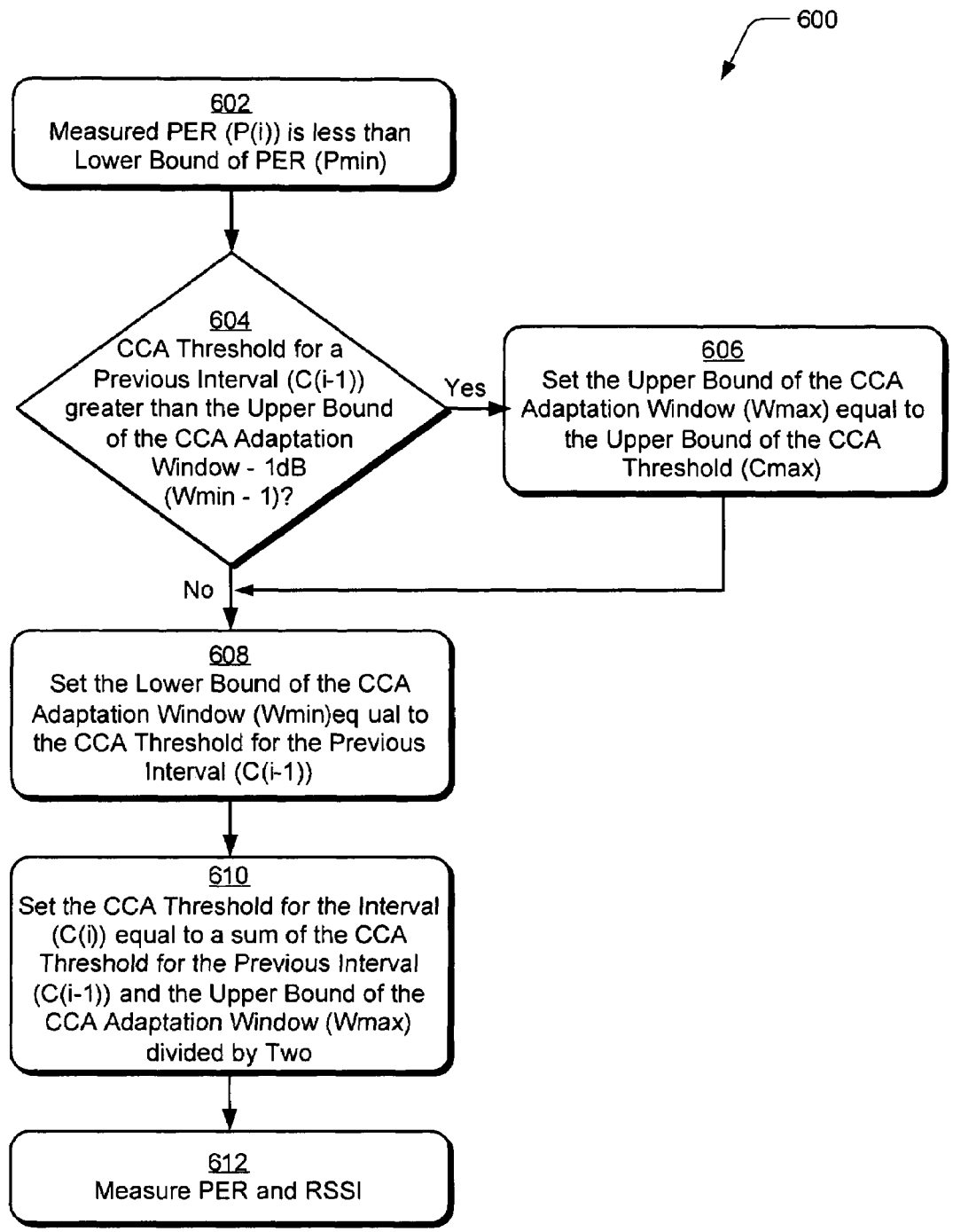
FIG. 6 is a flow diagram depicting a procedure in an exemplary implementation in which an adaptation window is updated and a clear channel assessment threshold is raised when a measured packet error rate of FIG. 4 is less than a lower bound of a packet error rate target range.

FIGS. 4, 5 and 6 depict procedures 400, 500 and 600 in exemplary implementations in which measuring, updating of a CCA adaptation window and adjusting of the CCA threshold (e.g., as described in the procedure of FIG. 3) are described in greater detail. Upon initiation of a wireless node, an upper bound of a CCA adaptation window (Wmax) is set equal to an upper bound of a CCA threshold and a lower bound of the CCA adaptation window is set equal to a lower bound of a CCA threshold (block 402). Additionally, an interval (i) count is set equal to zero and the CCA threshold in the "ith" interval (C(i)) is set equal to a default value of the CCA threshold (C0) (block 402).

After initialization, the interval (i) is set equal to (i+1) (i.e., incremented) and a packet error rate (P(i)) and a received signal strength indicator (S(i)) are measured (block 404) for that interval. It should be noted that the CCA threshold may be updated whenever measurement is finished. Therefore, the duration of the measurement (i.e., interval (i)) may be used to determine how frequently the CCA threshold is adjusted. The duration of the measurement (i.e., interval (i)) may be defined in a variety of ways.

For instance, the interval may be defined as a predetermined amount of time "T" such that when the amount of time "T" expires, the CCA adaptation window and the CCA threshold are adjusted, if desired. In another instance, the interval may be defined to expire when a number of data packets that are transmitted reaches a number "N". A variety of other instances are also contemplated, such as through a combination of conditions, e.g., if a number of transmitted data packets is lower than a threshold "N0" when a predetermined amount of time "T" has expired (in other words, that a desired amount of samples has not been obtained during a desired amount of time), measuring may be restarted.

The packet error rate (PER) may also be measured in a variety of ways. For example, the packet error rate may be defined according to the following expression:

$$\frac{\text{Total Number of Retransmissions}}{\text{Total Number of Successful Transmissions} + \text{Total Number of Retransmissions}}$$

Therefore, the PER may be obtained by calculating a total number of retransmissions and a total number of successful transmission performed during the measurement interval.

Likewise, the received signal strength indicator (RSSI) measurement may be obtained from a variety of sources, such as from a driver employed to coordinate operation of a wireless device with another computing device. For example, a device driver of a wireless card used to enable operation with a desktop computer may provide the RSSI. A variety of other examples are also contemplated.

A determination is made as to whether the measured RSSI (S(i)) is less than as RSSI threshold (S(0)) (decision block 406). If not ("no" from decision block 406), the procedure 400 returns to initialization (block 402). This may be used to mitigate the effect of co-channel interference (CCI) variation on packet error rate measurement as well as multi-path fading, platform noise, and so on. By defining the minimum signal strength (S0), the procedure 400 does not continue when these factors can be ignored thereby optimizing resources of the wireless nodes that perform these operations.

When the measured RSSI (S(i)) is greater than the RSSI threshold (S(0)) ("yes" from decision block 406), a determination is made as to whether the measured PER (P(i)) is greater than an upper bound of a PER target range (Pmax) (decision block 408). If not ("no" from decision block 408), a determination is made as to whether the measured PER (P(i)) is less than an lower bound of a PER target range (Pmin) (decision block 410). In this way, the PER is not necessarily minimized but rather is maintained with the PER target range that specifies optimal spatial reuse.

Therefore, if the measured PER is too high ("yes" from decision block 408), the adaptation window is updated and the CCA reduced according to the procedure 500 of FIG. 5. By reducing the CCA threshold, sensing range of the wireless node is enlarged, leading to a larger area that is protected from collisions and other causes of packet communication error, further discussion of which may be found in relation to FIG. 5.

When the measured PER is too low ("yes" from decision block 410), the adaptation window is updated and the CCA threshold is raised accordingly to the procedure 600 (block 414). By raising the CCA threshold, the sensing range is reduced which allows for additional spatial reuse, such as due to reduction of deferrals due to "far away" transmissions as described in relation to FIG. 2. Further discussion of CCA threshold reduction may be found in relation to FIG. 6.

FIG. 5 depicts a procedure 500 in an exemplary implementation in which an adaptation window is updated and a CCA threshold is reduced when a measured packet error rate (PER) is greater than an upper bound of a packet error rate target range. To speed convergence of CCA dynamic adaptation, an adaptation window (defined by Wmax and Wmin) is maintained to track the most recent CCA threshold that caused the measured PER to exceed the PER target range defined by Pmax and Pmin.

Continuing from the procedure 400 of FIG. 4 (and more specifically block 412 of FIG. 4), the measured PER (P(i)) is greater than an upper bound (Pmax) of the PER target range (block 502). A determination is then made as to whether a CCA threshold for a previous interval (C(i−1)) is lower than the lower bound of the CCA adaptation window within a predetermined amount (e.g., plus one Decibel) (Wmin+1) (decision block 504).

As previously described in relation to FIG. 3, for instance, this determination may be made to determine whether the current CCA threshold is "too close" (in this example within one Decibel) to a boundary of the adaptation window. If so ("yes" from decision block 504), the lower bound of the CCA adaptation window (Wmin) is set equal to the lower bound of the CCA threshold (Cmin) (block 506). Thus, the procedure 500 of FIG. 5 readjusts the boundary of the adaptation window within the predefined boundary of the CCA threshold set by Cmin in this example.

When the CCA threshold for the previous interval (C(i−1)) is not lower than the lower bound of the CCA adaptation window plus one Decibel (Wmin+1) ("no" from decision block 504) or after the lower bound of the CCA adaptation window (Wmin) is set equal to the lower bound of the CCA threshold (Cmin) (block 506), the upper bound of the CCA adaptation window (Wmax) is set equal to the CCA threshold for the previous interval (C(i−1)) (block 508). Thus, at this point the adaptation window defined by Wmax and Wmin is updated based on the effect of CCA threshold from previous measurement interval on the current interval.

The CCA threshold may also be adjusted based on the observed effect of the previous interval on PER. In the example of FIG. 5, for instance, in which measured PER (P(i)) is greater than the upper bound (Pmax) of the PER target range, the CCA threshold for the interval (C(i)) is set equal to a sum of a CCA threshold for a previous interval (C(i−1)) and the lower bound of the CCA adaptation window (Wmin) divided by two (block 510). Measurement of PER and RSSI (block 512) may then continue, e.g., the procedure 500 may return back to block 404 of FIG. 4. A variety of other techniques may also be utilized to adjust the CCA threshold.

FIG. 6 depicts a procedure 600 in an exemplary implementation in which an adaptation window is updated and a CCA threshold is raised when a measured packet error rate (PER) is less than a lower bound of the PER target range. Like the procedure 500 of FIG. 5, the adaptation window defined by Wmax and Wmin is maintained to track the most recent CCA threshold that caused the measured PER to exceed the PER target range defined by Pmax and Pmin to speed convergence of CCA threshold adaptation.

For example, continuing from block 414 of the procedure 400 of FIG. 4, the measured PER (P(i)) is less than a lower bound (Pmin) of the PER target range (block 602). Therefore, a determination is then made as to whether a CCA threshold for a previous interval (C(i−1)) is greater than the upper bound of the CCA adaptation window minus one Decibel (Wmin−1) (decision block 604).

Like FIG. 5, this determination may be made to determine whether the current CCA threshold is "too close" (in this example within one Decibel) to the boundary of the adaptation window, which in this instance is the lower boundary defined by Pmin. If so ("yes" from decision block 604), the upper bound of the CCA adaptation window (Wmax) is set equal to the upper bound of the CCA threshold (Cmax) (block 506).

When the CCA threshold for the previous interval (C(i−1)) is not greater than the upper bound of the CCA adaptation window minus one Decibel (Wmin−1) ("no" from decision block 604) or after the upper bound of the CCA adaptation window (Wmax) is set equal to the upper bound of the CCA threshold (Cmax) (block 606), the lower bound of the CCA adaptation window (Wmin) is set equal to the CCA threshold for the previous interval (C(i−1)) (block 608). Like before, the adaptation window defined by Wmax and Wmin is thus updated based on the effect of CCA threshold from previous measurement interval on the current interval.

The CCA threshold is also be dynamically adjusted based on the observed effect of the previous interval on PER. For instance, in the procedure 600 of FIG. 6 the measured PER is less than the lower bound of the CCA threshold for the interval. Therefore, in this procedure 600 the CCA threshold (C(i)) is set equal to a sum of a CCA threshold for a previous interval (C(i−1)) and the upper bound of the CCA adaptation window (Wmax) divided by two (block 610). Measurement of PER and RSSI (block 612) may then continue, e.g., the procedure 600 may return back to block 404 of FIG. 4. As before, a variety of other techniques may also be utilized to adjust the CCA threshold. Although this description described a quantity of one Decibel, it should be readily apparent that a wide variety of amounts within the boundaries may also be defined and used.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising a module to adapt a clear channel assessment (CCA) threshold based on a measured packet error rate (PER) to maintain the packet error rate within a target range, wherein the module is to adapt the clear channel assessment threshold through use of an upper bound and a lower bound of the target range, wherein the module is to further adapt the clear channel assessment (CCA) threshold through either:
    a reduction of the CCA threshold when the measured packet error rate (PER) is greater than the upper bound of the target range; or
    an increase in the CCA threshold when the measured packet error rate (PER) is less than the lower bound of the target range.

2. An apparatus as described in claim 1, wherein the target range is defined to approximate optimal spatial reuse in a wireless environment.

3. An apparatus as described in claim 1, wherein the module is to adapt the clear channel assessment threshold when a measured received signal strength indicator (RSSI) is above a RSSI threshold.

4. An apparatus as described in claim , wherein the measured packet error rate (PER) is determined over a measurement interval that is defined by an amount of time or a number of transmitted data packets.

5. An apparatus as described in claim 1, wherein the measured packet error rate (PER) is equal to a total number of retransmissions divided by a sum of a total number of successful transmissions and the total number of retransmissions.

6. An apparatus as described in claim 1, wherein the module is to adapt the clear channel assessment (CCA) threshold through use of a CCA adaptation window that is to track a previous CCA threshold that led to the measured packet error rate to fall outside the target range.

7. An apparatus as described in claim 6, wherein the module is to adapt the clear channel assessment (CCA) threshold through use of the CCA adaptation window by setting the CCA threshold according to a CCA threshold for a previous measurement interval and a boundary of the CCA adaptation window.

8. An apparatus as described in claim 6, wherein the module is to adapt the clear channel assessment (CCA) threshold by setting the CCA threshold equal to one half of a sum of a CCA threshold for a previous measurement interval and a boundary of the CCA adaptation window.

9. An apparatus as described in claim 6, wherein the module is to adapt the clear channel assessment (CCA) threshold through an adjustment to a boundary of the CCA adaptation window if the CCA threshold is within a predetermined amount of the boundary of the CCA adaptation window.

10. An apparatus as described in claim 9, wherein the adjustment to the boundary of the clear channel assessment (CCA) window is to be made by setting the boundary of the CCA adaptation window equal to a predefined boundary of the CCA threshold.

11. An apparatus as described in claim 1, wherein the module is included within a wireless station that includes a wireless transmitter and a wireless receiver.

12. A computer-implemented method comprising:
storing, in a memory, instructions for performing the computer-implemented method;
executing the instructions on a processor;
according to the instructions being executed:
obtaining a packet error rate (PER) measurement; and
when the measured PER falls outside a target range, adjusting a clear channel assessment (CCA) threshold using an adaptation window that tracks at least one previous CCA threshold, wherein the adjusting includes when the measured PER is either:
greater than an upper bound of the target range, setting the CCA threshold equal to approximately one half of a sum of a CCA threshold for a previous measurement interval and a lower bound of the CCA adaptation window; or
less than a lower bound of the target range, setting the CCA threshold equal to approximately one half of a sum of a CCA threshold for a previous measurement interval and an upper bound of the CCA adaptation window.

13. A system comprising:
a wireless receiver;
a display device to display data related to the wireless receiver; and
a module to adapt a clear channel assessment (CCA) threshold when the CCA threshold is outside of a target range through use of a measured packet error rate (PER) and an adaptation window to track at least one previous CCA threshold, wherein the module is to adapt the clear channel assessment (CCA) threshold either:
through a reduction of the CCA threshold when the measured packet error rate (PER) is greater than an upper bound of the target range; or
through an increase in the CCA threshold when the measured packet error rate (PER) is less than the lower bound of the target range.

14. One or more computer readable media comprising computer executable instructions that, when executed, direct a computer to:
obtain a packet error rate (PER) measurement; and
when the measured PER falls outside a target range, adjust a clear channel assessment (CCA) threshold using an adaptation window that tracks at least one previous CCA threshold, wherein the adjustment is to be performed such that:
when the measured packet error rate is greater than an upper bound of the target range, the CCA threshold is set equal to approximately one half of a sum of a CCA threshold for a previous measurement interval and a lower bound of the CCA adaptation window; or
when the measured packet error rate is less than a lower bound of the target range, the CCA threshold is set equal to approximately one half of a sum of a CCA threshold for a previous measurement interval and an upper bound of the CCA adaptation window.

15. An apparatus comprising a module to adapt a clear channel assessment (CCA) threshold based on a measured packet error rate (PER) to maintain the packet error rate within a target range, wherein the module is to adapt the clear channel assessment (CCA) threshold through use of a CCA adaptation window that is to track a previous CCA threshold that led to the measured packet error rate to fall outside the target range, wherein the module is to adapt the clear channel assessment (CCA) threshold:
through use of the CCA adaptation window by setting the CCA threshold according to a CCA threshold for a previous measurement interval and a boundary of the CCA adaptation window;
by setting the CCA threshold equal to one half of a sum of a CCA threshold for a previous measurement interval and a boundary of the CCA adaptation window; or
through an adjustment to a boundary of the CCA adaptation window if the CCA threshold is within a predetermined amount of the boundary of the CCA adaptation window.

16. An apparatus as described in claim 15, wherein the adjustment to the boundary of the clear channel assessment (CCA) window is to be made by setting the boundary of the CCA adaptation window equal to a predefined boundary of the CCA threshold.

* * * * *

UNITED STATES PATENT AND TRADEMARK OFFICE
CERTIFICATE OF CORRECTION

| | | |
|---|---|---|
| PATENT NO. | : 7,623,494 B2 | Page 1 of 1 |
| APPLICATION NO. | : 11/436257 | |
| DATED | : November 24, 2009 | |
| INVENTOR(S) | : Zhu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this

Twenty-sixth Day of October, 2010

David J. Kappos
*Director of the United States Patent and Trademark Office*